(12) United States Patent
Itaya

(10) Patent No.: US 8,144,284 B2
(45) Date of Patent: Mar. 27, 2012

(54) LIQUID CRYSTAL DISPLAY DEVICE

(75) Inventor: Hideki Itaya, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 101 days.

(21) Appl. No.: 12/820,594

(22) Filed: Jun. 22, 2010

(65) Prior Publication Data

US 2010/0328571 A1      Dec. 30, 2010

(30) Foreign Application Priority Data

Jun. 26, 2009   (JP) ................. 2009-152477

(51) Int. Cl.
G02F 1/1333   (2006.01)

(52) U.S. Cl. ................. 349/58; 349/59; 349/60

(58) Field of Classification Search .............. 349/58–60
See application file for complete search history.

(56) References Cited

U.S. PATENT DOCUMENTS 8,045,094 B2 * 10/2011 Teragawa ................. 349/64

FOREIGN PATENT DOCUMENTS

JP   2007-256467 A   10/2007

* cited by examiner

*Primary Examiner* — Phu Vu

(74) *Attorney, Agent, or Firm* — Sughrue Mion, PLLC

(57) ABSTRACT

A liquid crystal display device includes a liquid crystal panel, a backlight, a frame having flexibility which includes a base portion and a side portion, and a case which is attached on a side opposite to the display surface side of the frame and engages with the frame, wherein a claw portion which is provided on an inner surface of the side portion of the frame and projected toward a liquid crystal panel and, a protruding portion which pushes the claw portion toward the liquid crystal panel is provided on at least one of the inner surface of the side portion of the case and an outer surface of the side portion of the frame, and the claw portion which is contact with the display surface of the liquid crystal panel in a state in which the claw portion is pressed by the protruding portion.

5 Claims, 11 Drawing Sheets

LIQUID CRYSTAL DISPLAY DEVICE

This application is based upon and claims the benefit of priority from Japanese Patent Application No. 2009-152477, filed on Jun. 26, 2009, the disclosure of which is incorporated herein in its entirety by reference.

TECHNICAL FIELD

The present invention relates to a liquid crystal display device.

BACKGROUND ART

Generally, a device such as a mobile phone, a mobile information terminal, or the like has a display panel. A liquid crystal display device which includes a liquid crystal panel and a backlight that is an illuminating device is widely used for the display panel.

The liquid crystal panel and the backlight are fixed to each other through a sheet-shaped adhesive member attached to the frame of the backlight. The double-faced adhesive tape having a light blocking characteristic is mainly used for this adhesive member. Usually, the liquid crystal display device used for the mobile phone or the like has a structure in which no outer case (front chassis) is assembled to a display surface side of the liquid crystal panel. In this case, the liquid crystal panel and the backlight are fixed to each other through only the double-faced adhesive tape. An area of this double-faced adhesive tape is determined by an area of a non-display region of the liquid crystal panel. On the other hand, in recent years, the size of the liquid crystal display device has been reduced. Thus, the area of the non-display region tends to be reduced.

When the liquid crystal display device is installed in a portable device or the like and used, a flexible cable connecting the liquid crystal panel and a control board of the portable device is bent toward a side opposite to the display surface of the liquid crystal display device. At that time, a bending stress occurs in the flexible cable. Consequently, when a bonding strength of the double-faced adhesive tape through which the liquid crystal panel and the backlight are fixed to each other is low, there is a possibility in which the liquid crystal panel and the double-faced adhesive tape are separated from each other.

When the separation of the liquid crystal panel from the backlight occurs, the light from the backlight is not applied to the liquid crystal panel effectively. Accordingly, the display quality is lowered. In case that a touch panel for operating the mobile terminal or a protection panel for protecting the liquid crystal panel from being damaged is provided on the liquid crystal panel, these members contact with the liquid crystal panel. Accordingly, the display quality is further lowered.

FIG. 10 is an exploded perspective view of a display device described in Japanese Patent Application Laid-open Publication No. 2007-256467. FIG. 11 shows a shape of a protruding portion provided in the display device shown in FIG. 10. Specifically, when a circuit board 110 having flexibility shown in FIG. 10 is bent in a direction of a frame 300, the stress is applied to an adhesive sheet 120 with which a display panel 100 is bonded to a light guide plate 108. Consequently, a force is applied in a direction in which the display panel 100 is separated from the light guide plate 108. Here, the display device shown in FIG. 10 has a protruding portion 30 having a surface inclined to an outer surface of the display panel 100 on an inner surface of the frame 300. The protruding portion 30 presses the outer surface of the display panel 100 accommodated in the frame 300. Whereby, the display panel 100 is fixed to the frame 300. The protruding portion 30 is made of an elastic member. Accordingly, when the display panel 100 is accommodated in the frame 300, the display panel 100 is held by an elastic return force of the protruding portion 30.

As shown in FIG. 11A and FIG. 11B, the protruding portion 30 is provided on the inner surface of the frame 300 that faces the outer surface of the display panel 100 in the display device shown in FIG. 10. The protruding portion 30 has a surface inclined to the outer surface of the display panel 100 and is brought into contact with the outer surface of the display panel in a pressed state. In this case, the inner size of the frame 300 including the protruding portion 30 has to be smaller than the outer size of the display panel 100. The outer surface of the display panel 100 is brought into contact with the frame 300 during and after assembly to the frame 300.

A substrate used for the display panel 100 is made of mainly glass. Therefore, when the outer surface of the display panel 100 contacts with the frame 300, the member of the frame side is ground by a hard convexo-concave part of the end of the glass substrate and a foreign particle is generated. When the foreign particle is generated, the display quality is lowered.

The protruding portion 30 has to be made of the elastic member. Therefore, either a structure in which the whole frame 300 is made of the elastic member or a structure in which only the protruding portion 30 of the frame 300 is made of the elastic member has to be used. When the structure in which only the protruding portion 30 is made of the elastic member is used, the structure of the frame 300 becomes complex. As a result, easiness of assembling is lowered. On the other hand, when the structure in which the whole frame 300 is made of the elastic member is used, the strength of the frame may be reduced. Additionally, when the other member such as the touch panel or the like is attached to the frame 300, the other member may contact with the display panel. As a result, the display quality may be lowered.

SUMMARY

An exemplary object of the present invention is to provide a liquid crystal display device in which a liquid crystal panel is securely fixed and the degradation of the display quality caused by the shavings produced when the liquid crystal panel is brought into contact with the other member can be prevented.

BRIEF DESCRIPTION OF THE DRAWINGS

Exemplary features and advantages of the present invention will become apparent from the following detailed description when taken with the accompanying drawings in which.

EXEMPLARY EMBODIMENT

An exemplary embodiment of the present invention will be described with reference to the drawings. However, the technical scope of the present invention is not limited to the exemplary embodiment.

First Exemplary Embodiment

Figure 1A:
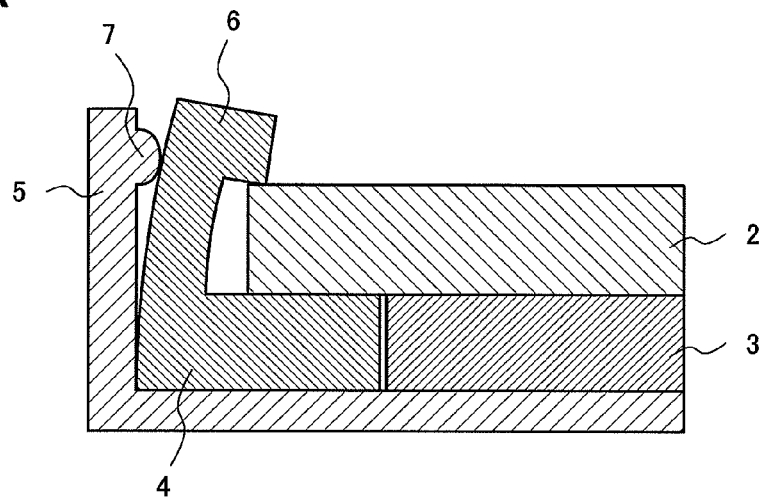
FIGS. 1 A-C are sectional views showing a structure of a liquid crystal display device according to a first exemplary embodiment of the present invention.

FIG. 1A is a sectional view of a liquid crystal display device according to a first exemplary embodiment of the present invention. A liquid crystal display device 1 of the exemplary embodiment includes a liquid crystal panel 2, a backlight 3, a frame 4 and a case 5. The backlight 3 is attached to the liquid crystal panel 2. The frame 4 has a base portion which holds the backlight 3 and a side portion which surrounds a side surface of the liquid crystal panel 2 fixed to a display surface side of the base portion. The frame 4 has flexibility. The case 5 is attached from a side opposite to the display surface side of the frame 4 and engages with the frame 4. The case 5 is made of, for example, a SUS (Stainless Used Steel) or the like.

A claw portion 6 which is projected toward a liquid crystal panel 2 and configured to be movable by a slit provided at both sides thereof is provided on an inner surface of the side portion of the frame 4.

Figure 1B:
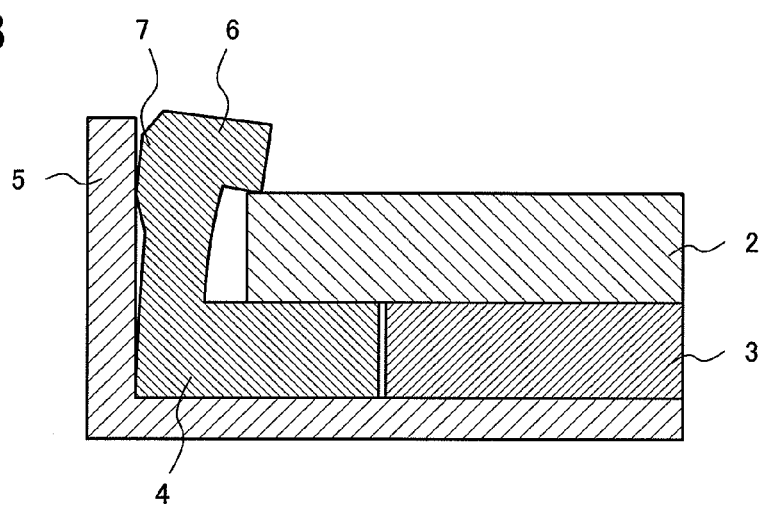
Figure 1C:
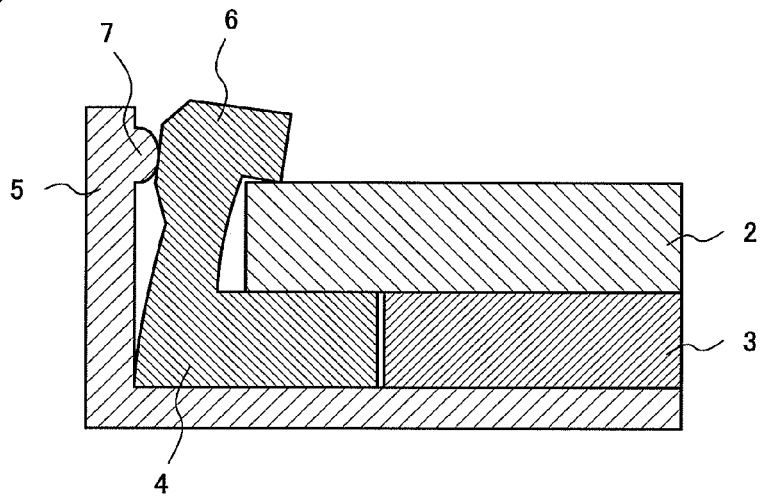

A protruding portion 7 which pushes the claw portion 6 toward the liquid crystal panel 2 is provided on an inner surface of the side portion of the case 5. The protruding portion 7 may be provided on an outer surface of the side portion of the frame 4 as shown in FIG. 1B. Otherwise the protruding portion 7 may be provided both on the inner surface of the side portion of the case 5 and on the outer surface of the side portion of the frame 4 as shown in FIG. 1C.

The claw portion 6 is formed so that an end of the claw portion 6 is brought into contact with the display surface of the liquid crystal panel 2 in a state in which the claw portion 6 is pressed by the protruding portion 7.

Next, a method for assembling the liquid crystal display device 1 of the exemplary embodiment will be described.

First, the liquid crystal panel 2 is assembled to the frame 4 which holds the backlight 3. The liquid crystal panel 2 is fixed to the frame 4. The liquid crystal panel 2 is fixed to the frame 4 by using an adhesive material such as a double-faced adhesive tape or the like. After that, the case 5 is fixed to the frame 4. At that time, the protruding portion 7 provided on the case 5 pushes the claw portion 6 provided on the frame 4. Whereby the claw portion 6 is moved inward and presses the display surface of the liquid crystal panel 2.

Thus, in this exemplary embodiment, the claw portion 6 can press the display surface of the liquid crystal panel 2. As a result, even if a bending stress occurs in the flexible cable of the backlight 3, the separation of the liquid crystal panel 2 from the backlight 3 can be prevented. The liquid crystal panel 2 can be assembled from the front of the backlight 3 without contacting with the side portion of the frame 4. Therefore, the assembling work can be easily performed. Moreover, the degradation of the display quality caused by the resin shavings (foreign particle) produced when an end of a glass substrate of the liquid crystal panel 2 is brought into contact with the frame 4 can be prevented.

Further, the liquid crystal display device of this embodiment is used for a mobile terminal or the like that has a structure in which no outer case (front chassis) is assembled to the display surface side of the liquid crystal panel.

Second Exemplary Embodiment

Figure 2:
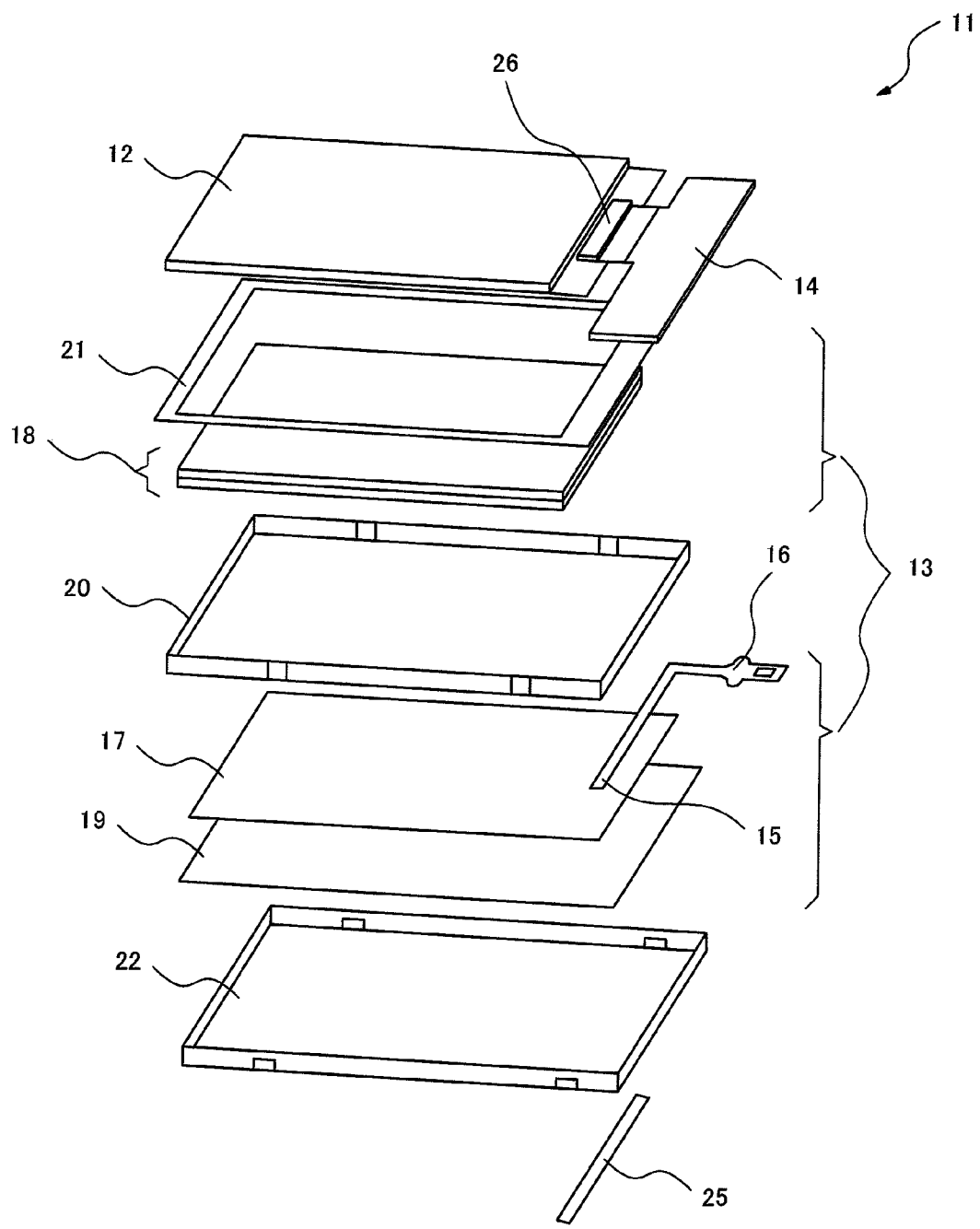
FIG. 2 is an exploded perspective view showing a structure of a liquid crystal display device according to a second exemplary embodiment of the present invention.
Figure 3:
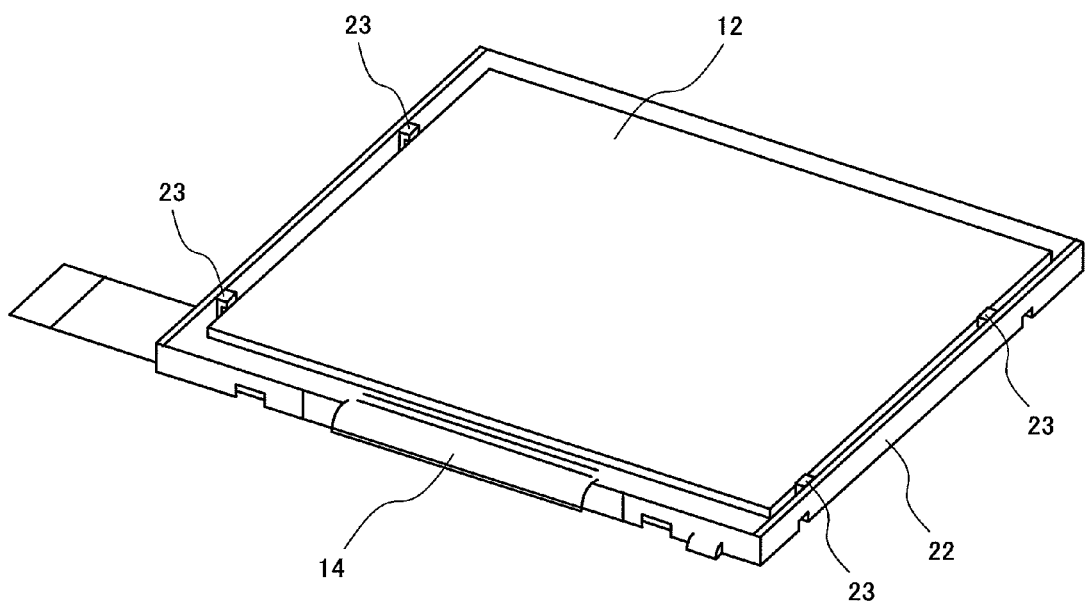
FIG. 3 is a perspective view showing a structure after assembling of a liquid crystal display device according to a second exemplary embodiment of the present invention.
Figure 4:
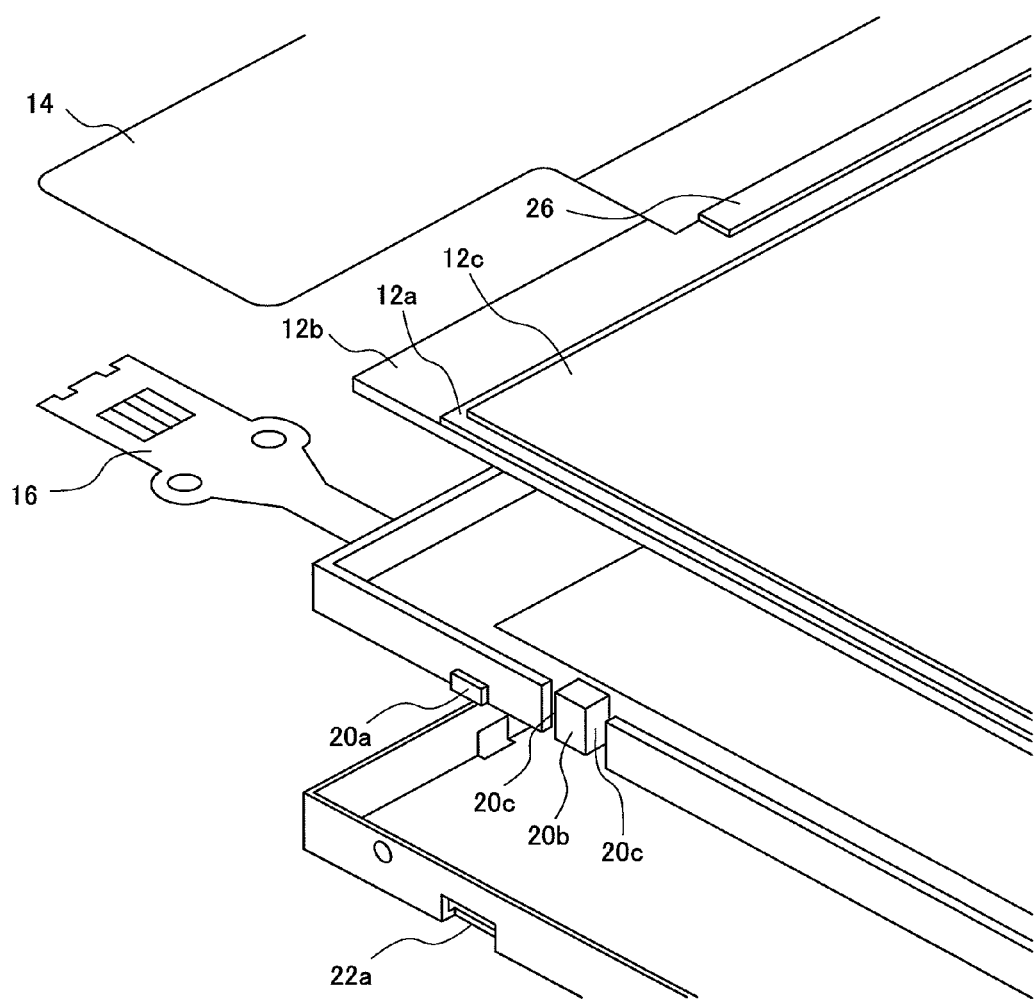
FIG. 4 is an enlarged exploded perspective view showing a part (engaging portion at which a shield case, a resin frame and a liquid crystal panel are engaged with each other) of the liquid crystal display device according to a second exemplary embodiment of the present invention.

A liquid crystal display device according to a second exemplary embodiment of the present invention will be described with reference to FIG. 2 to FIG. 5. FIG. 2 is an exploded perspective view showing a structure of the liquid crystal display device according to the exemplary embodiment. FIG. 3 is a perspective view showing a structure after assembling the liquid crystal display device according to the exemplary embodiment. FIG. 4 is an enlarged exploded perspective view showing a part of the liquid crystal display device according to the exemplary embodiment. FIG. 5 is a sectional view illustrating an operation of the part of the liquid crystal display device according to the exemplary embodiment.

As shown in FIG. 2 and FIG. 3, a liquid crystal display device 11 of the exemplary embodiment includes a liquid crystal panel 12, a backlight 13, a frame 20, and a shield case 22.

Figure 5A:
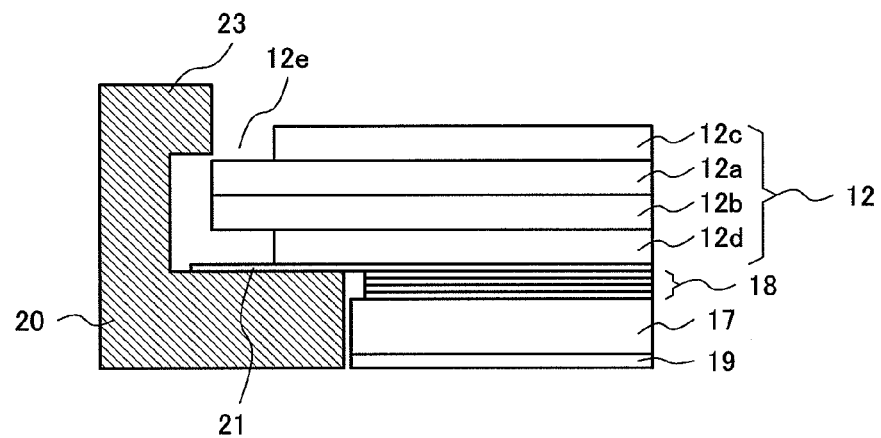
FIGS. 5A, B are sectional views illustrating an operation of a part of a liquid crystal display device according to a second exemplary embodiment of the present invention.

The liquid crystal panel 12 includes two glass substrates 12a and 12b (shown in FIG. 5A) between which a liquid crystal is sandwiched and two polarizers 12c and 12d (shown in FIG. 5A). The polarizer 12c is disposed to a display surface of the glass substrate 12a. The polarizer 12d is disposed to a rear surface of the glass substrate 12b. A driver IC (Integrated Circuit) 26 and a flexible cable 14 are connected to the liquid crystal panel 12. The driver IC 26 controls an operation of the liquid crystal panel 12. The liquid crystal panel 12 is connected to a control device by the flexible cable 14.

The backlight 13 is attached to the liquid crystal panel 12 and illuminates the liquid crystal panel 12. The backlight 13 includes a light source 15, a flexible cable 16, a light guide plate 17, an optical sheet 18, and a reflection sheet 19. The light source 15 is a LED (Light Emitting Diode) and the like. The flexible cable 16 is equipped with the light source 15. The light guide plate 17 is made of acrylic resin, polycarbonate or the like that converts the light from the light source 15 into a flat light. The optical sheet 18 and the reflection sheet 19 guide the light from the light guide plate 17 to the liquid crystal panel 12 efficiently. The frame 20 is made of a resin such as polycarbonate or the like, has flexibility and accommodates the members of the backlight 13.

The frame 20 includes a part (base portion) that holds the backlight 13 and a part (side portion) that surrounds the side surface of the liquid crystal panel 12. The liquid crystal panel 12 is fixed by an adhesive member 21 that is pasted to the display surface side of the base portion of the frame 20. The double-faced adhesive tape having a light blocking effect is mainly used for this adhesive member 21. A shield case 22 using a metal member such as a SUS material or the like is assembled to the rear surface of the backlight 13 in order to ensure the strength. The shield case 22 and the frame 20 are formed so as to fit in with each other. Namely, a plurality of holes 22a (shown in FIG. 4) are provided on the side surface of the shield case 22 and a plurality of protruding portions 20a (shown in FIG. 4) corresponding to the holes are provided on the outer surface of the frame 20. A double-faced adhesive tape 25 for fixing the flexible cable 14 in a state in which the flexible cable 14 is bended to the rear surface of the liquid crystal display device 11.

FIG. 4 is an enlarged exploded perspective view showing a part of the liquid crystal display device 11 according to the exemplary embodiment. FIG. 5 is a sectional view showing the operation of the part. As shown in FIG. 4 and FIG. 5A, a claw portion 23 for hooking the display surface of the liquid crystal panel 12 is provided on the frame 20. A slit 20c is provided at both sides of the claw portion 23 so that the claw portion 23 of the frame 20 can be bended independently. A protruding portion 24 which is formed by emboss processing or the like is provided to the shield case 22. The protruding portion 24 is provided at a position at which when the frame 20 is assembled, the protruding portion 24 is brought into contact with the outer surface of the claw portion 23. The claw portion 23 with the same structure as mentioned above is provided at a plurality of positions on the frame 20.

The size of the end of the claw portion 23 is enough to hook the glass substrate 12a of the liquid crystal panel 12 and a step portion 12e when the shield case 22 is assembled. The step portion 12e is formed by bonding the polarizer 12c whose size is smaller than that of the glass substrate 12a on the glass substrate 12a. Thus, an end of the claw portion 23 is brought into contact with the display surface of the glass substrate 12a on an outer circumference of the polarizer 12c in a state in which the claw portion 23 is pressed.

The size of the liquid crystal panel 12 is determined so that when the liquid crystal panel 12 is assembled to the backlight 13 before the shield case 22 is assembled, the liquid crystal panel 12 does not contact with the side portion of the frame 20. Namely, a distance between the ends of two claw portions facing with each other before the shield case 22 is assembled is larger than the size of the liquid crystal panel 12 on the line connecting the ends of two claw portions.

Further, the thickness of the claw portion 23 is determined so that the shape of the claw portion 23 can be formed. However, in order to ensure the strength of the claw portion 23, it is desirable to use the claw portion 23 having a large thickness.

Figure 5B:
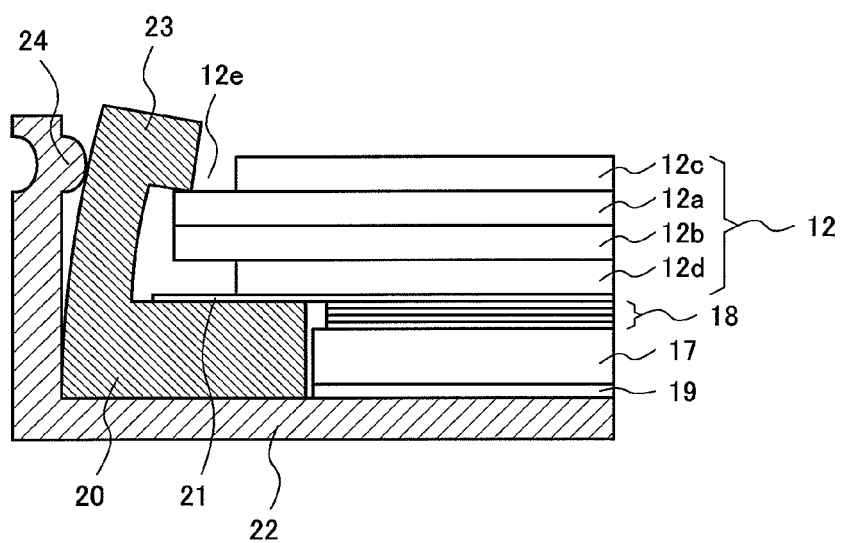

In the structure mentioned above, after the liquid crystal panel 12 is assembled to the backlight 13, the shield case 22 is assembled from the rear side. At that time, as shown in FIG. 5B, the protruding portion 24 provided on the shield case 22 presses the outer surface of the claw portion 23 provided on the frame 20. As a result, a part 20b having the claw portion 23 is inclined inward toward the liquid crystal panel 12. The end portion of the claw portion 23 that is inclined is displaced at a position at which the end portion contacts with the display surface of the glass substrate 12a of the liquid crystal panel 12. Thus, the end portion of the claw portion 23 can press the display surface of the glass substrate 12a.

As mentioned above, in this exemplary embodiment, the claw portion 23 is moved inward toward the inside of the frame 20 and presses the surface of the glass substrate 12a of the liquid crystal panel 12. As a result, the separation of the liquid crystal panel 12 from the adhesive member 21 caused by a repulsive force of the flexible cable 14 and a pressure applied from the outside can be prevented. In this exemplary embodiment, the liquid crystal panel 12 can be assembled from the front of the backlight 13 without contacting with the frame 20. Therefore, the assembling work can be easily performed. Because the end of the glass substrate of the liquid crystal panel 12 does not contact with the side portion of the frame 20 of the backlight 13, the resin shavings (foreign particle) does not occur. Therefore, the degradation of the display quality caused by generation of the foreign particle can be prevented.

In this embodiment, the frame 20 is a part which is separate to the backlight 13. However, the frame 20 can also be considered as a part included in the backlight 13.

Third Exemplary Embodiment

Figure 6:
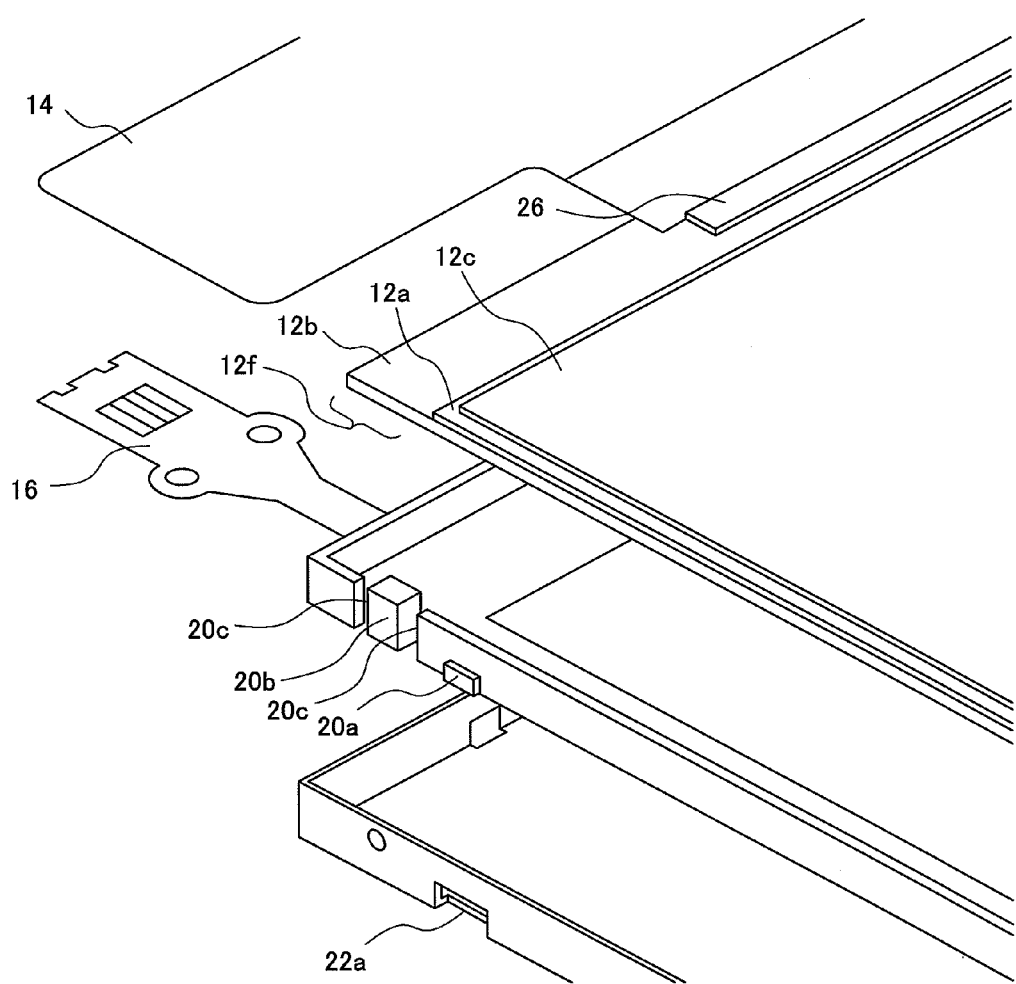
FIG. 6 is an enlarged exploded perspective view showing a part of a liquid crystal display device according to a third exemplary embodiment of the present invention.
Figure 7A:
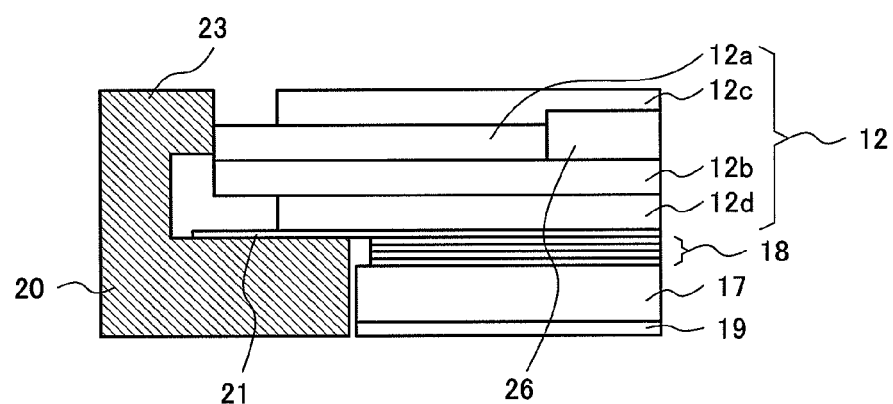
FIGS. 7A, B are sectional views illustrating an operation of a part of a liquid crystal display device according to a third exemplary embodiment of the present invention.

Next, a liquid crystal display device according to a third exemplary embodiment of the present invention will be described with reference to FIG. 6 and FIG. 7. FIG. 6 is an exploded perspective view showing a structure of a liquid crystal display device of the exemplary embodiment. FIG. 7 is a sectional view illustrating an operation of a part of the liquid crystal display device according to the exemplary embodiment. Further, although the glass substrate 12a, the driver IC 26, and the polarizer 12c are illustrated in FIG. 7, these components do not actually exist at the section of the liquid crystal display device as shown in FIG. 6. These components are illustrated for convenience of explanation of a positional relationship between components.

In the second exemplary embodiment, a structure in which the claw portion 23 of the frame 20 presses the end of the surface of the glass substrate 12a is used. However, a structure in which the liquid crystal panel 12 can be pressed by the claw portion 23 from the display surface side may be used. Therefore, in this exemplary embodiment, a structure in which the claw portion 23 presses the glass substrate 12b is used.

A structure of the liquid crystal display device according to the exemplary embodiment will be described specifically with reference to FIG. 6 and FIG. 7. As shown in FIG. 6, the driver IC 26 which controls the operation of the liquid crystal panel is mounted on the liquid crystal panel 12. The driver IC 26 is mounted on the glass substrate 12b of the liquid crystal panel 12. The glass substrate 12a is formed so that the size of the glass substrate 12a is smaller than that of the glass substrate 12b. Whereby, the glass substrate 12b includes an area 12f on which the glass substrate 12a does not exist. The driver IC 26 is mounted on the area 12f. The claw portion 23 hooks the area 12f. That is, an end of the claw portion 23 is brought into contact with the display surface of the glass substrate 12b on an outer circumference of the glass substrate 12a in a state in which the claw portion 23 is pressed.

Figure 7B:
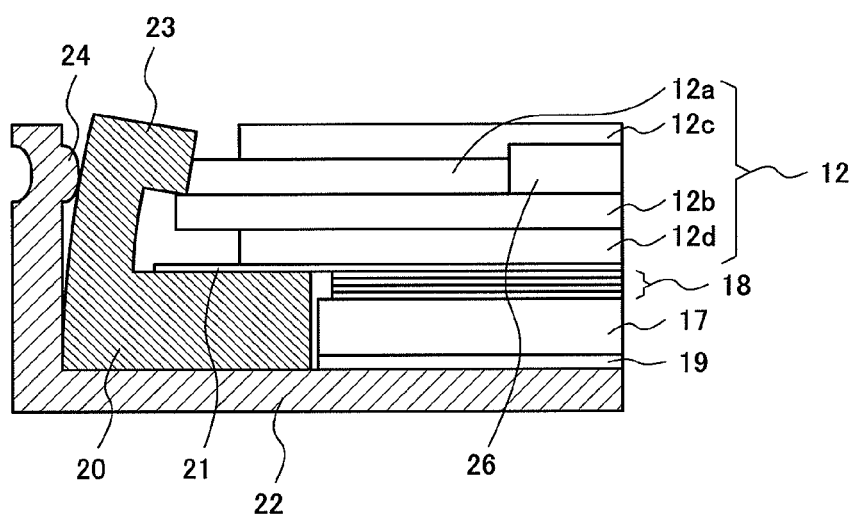

After the liquid crystal panel 12 is assembled to the backlight 13, the shield case 22 is assembled from the rear side. At that time, as shown in FIG. 7B, the protruding portion 24 provided on the shield case 22 presses the outer surface of the claw portion 23 provided on the frame 20. As a result, the part 20b having the claw portion 23 is inclined toward the liquid crystal panel 12. The end portion of the claw portion 23 that is inclined is displaced at a position at which the end portion contacts with the display surface side of the glass substrate 12b of the liquid crystal panel 12. Thus, the end portion of the claw portion 23 can presses the display surface side of the glass substrate 12b.

The third exemplary embodiment using a structure in which the claw portion 23 is moved inward and presses the surface of the glass substrate 12b of the liquid crystal panel 12 has similar effects as the second exemplary embodiment.

Namely, the separation of the liquid crystal panel 12 from the adhesive member 21 caused by the repulsive force of the flexible cable 14 and the pressure applied from the outside can be prevented. Further, the liquid crystal panel 12 can be assembled from the front of the backlight 13 without contacting with the frame 20 of the backlight 13. Therefore, the assembling work can be easily performed. Because the end of the glass substrate of the liquid crystal panel 12 does not contact with the resin frame 20, the resin shavings (foreign particle) does not occur. Therefore, the degradation of the display quality can be prevented.

Moreover, in this exemplary embodiment, a position at which the claw portion 23 is hooked shifts toward the rear surface of the liquid crystal display device 11 in a vertical direction in comparison with the second exemplary embodiment. As a result, the position at which the claw portion 23 is provided can be lowered and a structure in which the claw portion 23 does not protrude from the display surface side of the liquid crystal display device 11 can be realized. Therefore, the thickness of the liquid crystal display device 11 can be reduced.

Fourth Exemplary Embodiment

Next, a liquid crystal display device according to a fourth exemplary embodiment of the present invention will be described with reference to FIG. 8. FIG. 8 is a sectional view illustrating an operation of a part of the liquid crystal display-device according to the fourth exemplary embodiment.

In the liquid crystal display device of the second and third exemplary embodiment, the protruding portion 24 is provided on the shield case 22 and the protruding portion 24 presses the claw portion 23 of the frame 20. On the other hand, in the liquid crystal display device of this exemplary embodiment, the protruding portion is provided to the frame 20 and the claw portion 23 is pressed.

Figure 8A:
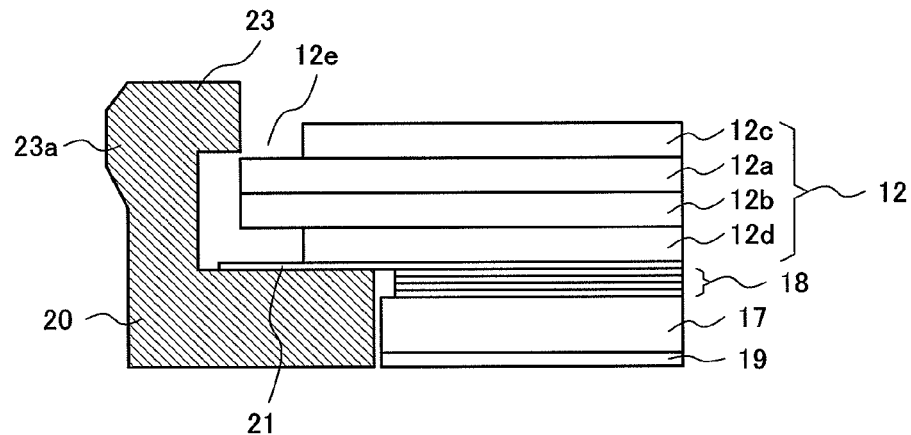
FIGS. 8A, B are sectional views illustrating an operation of a part of a liquid crystal display device according to a fourth exemplary embodiment of the present invention.

This structure will be described specifically with reference to FIG. 8. As shown in FIG. 8A, a protruding portion 23a is provided on the top of outer surface of the part 20b and the claw portion 23 is provided on the inner surface of the part 20b. A height at which the protruding portion 23a is provided is almost the same as the height at which the claw portion 23 is provided. The protruding portion is not provided on the shield case 22.

Figure 8B:
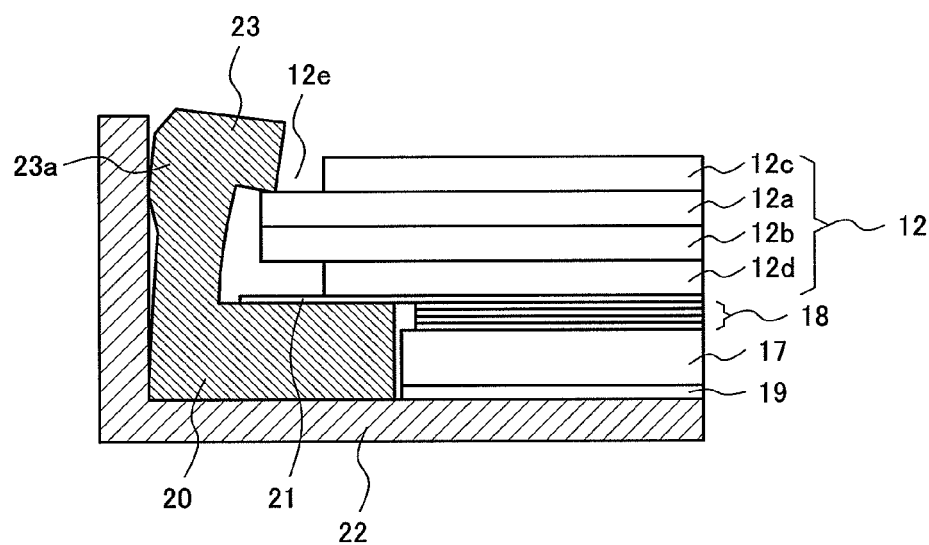

After the liquid crystal panel 12 is assembled to the backlight 13, the shield case 22 is assembled from the rear side. At that time, the shield case 22 presses the protruding portion 23a provided on the part 20b as shown in FIG. 8B. As a result, the part 20b having the claw portion 23 is inclined inward. The end portion of the claw portion 23 that is inclined is displaced at a position at which the end portion contacts with the display surface of the glass substrate 12a. Thus, the end portion of the claw portion 23 can presses the display surface of the glass substrate 12a.

Thus, the fourth exemplary embodiment using the above-mentioned structure has similar effects as the second and third exemplary embodiment. Namely, the separation of the liquid crystal panel 12 from the adhesive member 21 caused by the repulsive force of the flexible cable 14 and the pressure applied from the outside can be prevented. Further, the liquid crystal panel 12 can be assembled from the front of the backlight 13 without contacting with the frame 20. Therefore, the assembling work can be easily performed. Because the end of the glass substrate of the liquid crystal panel 12 does not contact with the resin frame 20, the resin shavings (foreign particle) does not occur. Therefore, the degradation of the display quality can be prevented.

Moreover, in this exemplary embodiment, the protruding portion is not provided on the shield case 22. Therefore, the production of the shield case, 22 can be simplified, productivity of the shield case 22 is improved and the cost can be reduced.

In this exemplary embodiment, a structure in which the end portion of the claw portion 23 presses the display surface of the glass substrate 12a of the liquid crystal panel 12 is used. However, a structure is not limited to this structure. Namely, a structure in which the end portion of the claw portion 23 presses the display surface of the glass substrate 12b may be used like the third exemplary embodiment.

Figure 9A:
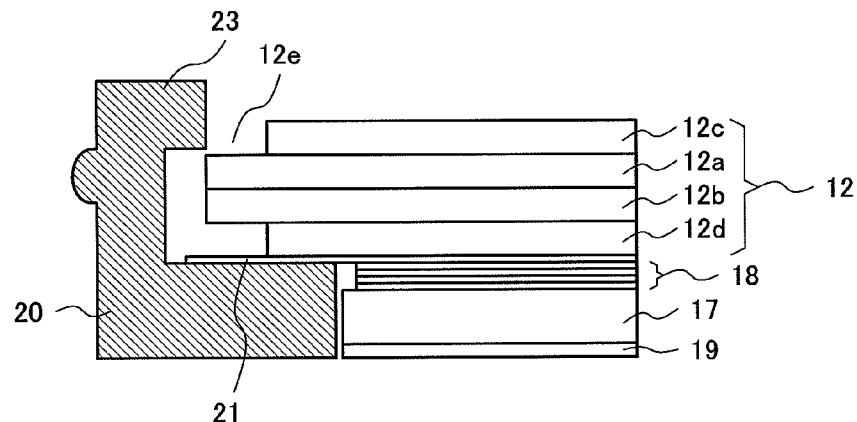
FIGS. 9A, B are sectional views illustrating another operation of a part of a liquid crystal display device according to a fourth exemplary embodiment of the present invention.
Figure 9B:
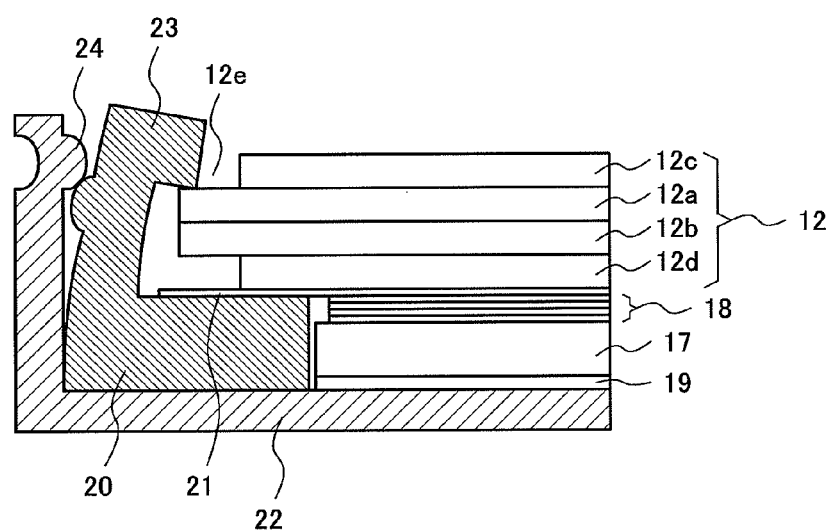
Figure 10:
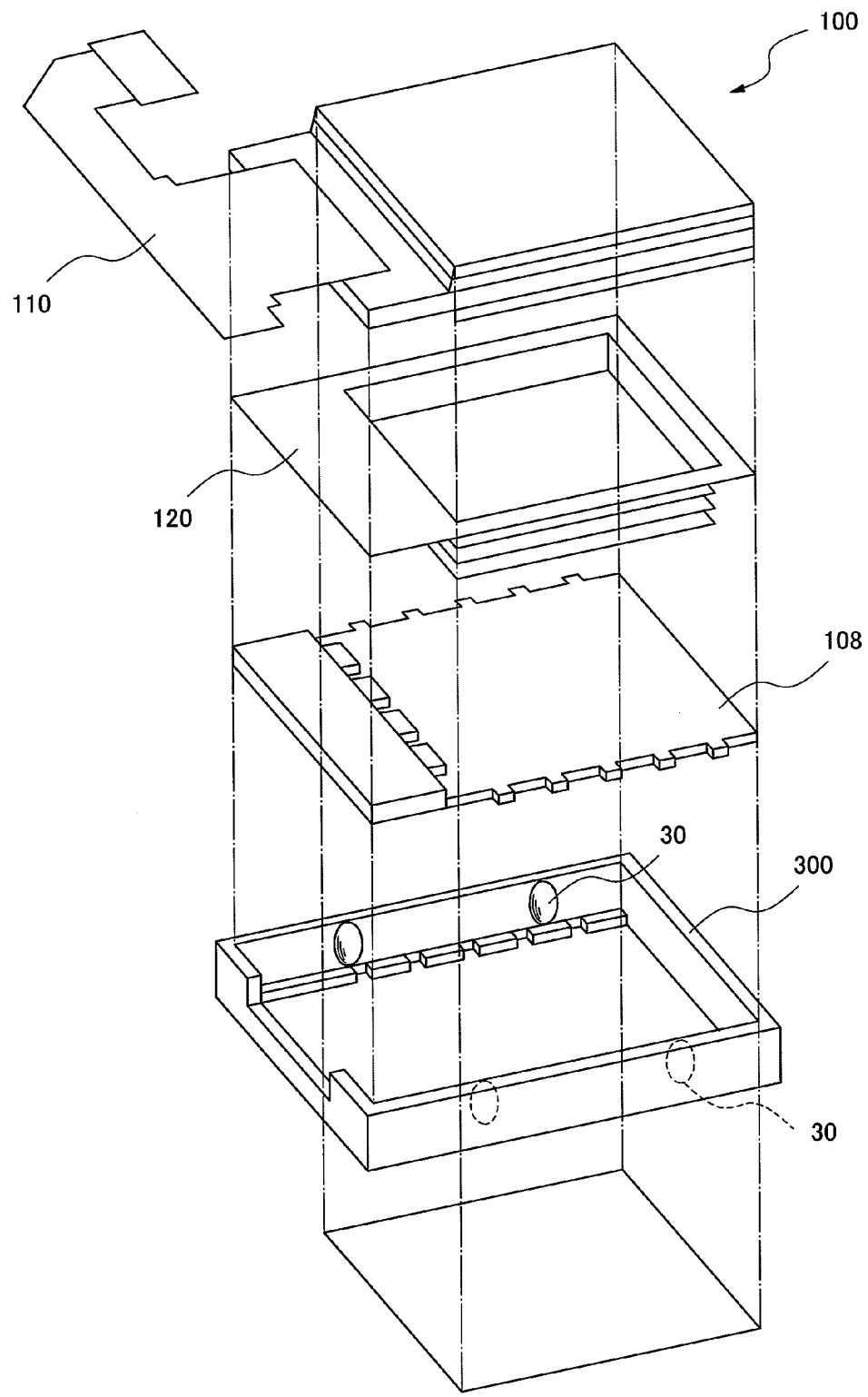
FIG. 10 is an exploded perspective view showing a structure of a display device related to the present invention.
Figure 11A:
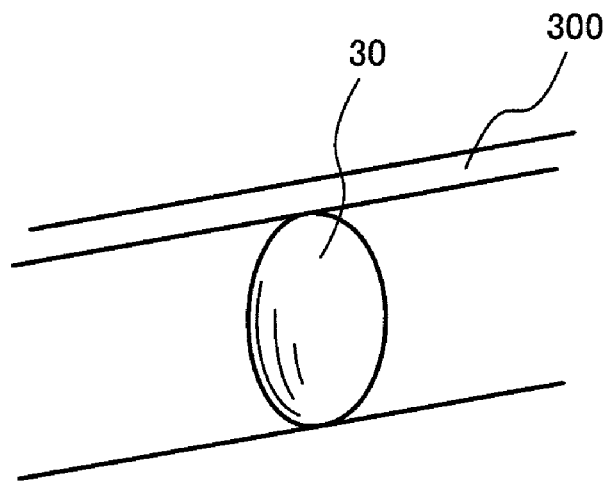
FIGS. 11 A, B show shapes of a protruding portion provided on a frame of a display device related to the present invention.
Figure 11B:
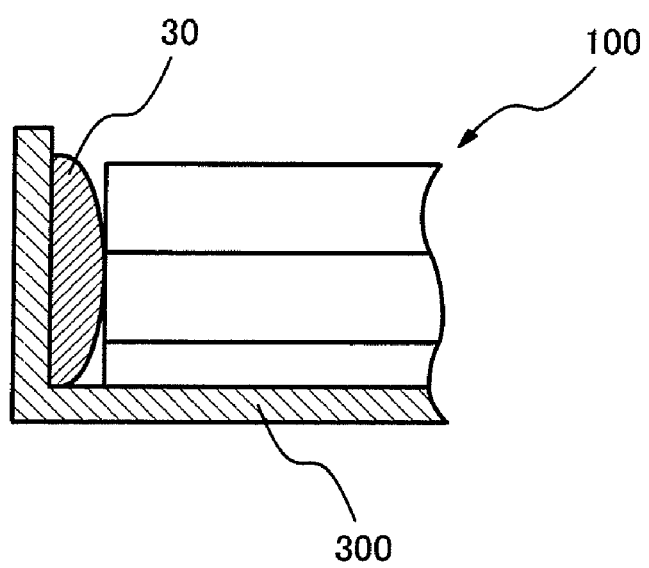

In this exemplary embodiment, the protruding portion 23a is provided on the outer surface of the frame 20 and no protruding portion is provided on the shield case 22. However, the protruding portion may be provided both on the outer surface of the frame 20 and on the shield case 22. In this case, as shown in FIG. 9, the position of the protruding portion of the shield case 22 may be lowered than that of the protruding portion of the frame 20. As a result, the shield case 22 can be more securely fixed to the frame 20.

In the exemplary embodiments mentioned above, the shape of the protruding portion, the frame, the shield case, or the like is shown as an example and the shape can be modified as long as the effect of present invention can be obtained.

The present invention can be applied to a liquid crystal display device, specifically, a liquid crystal display device used for a mobile terminal or the like that has a structure in which no outer case (front chassis) is assembled to the display surface side of the liquid crystal panel.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A liquid crystal display device comprising:

a liquid crystal panel;

a backlight which is attached to the liquid crystal panel;

a frame having flexibility which includes a base portion that holds the backlight and a side portion that surrounds a side surface of the liquid crystal panel fixed to a display surface side of the base portion; and a case which engages with the frame, wherein a claw portion which is provided on an inner surface of the side portion of the frame and projected toward a liquid crystal panel and, a protruding portion which pushes the claw portion toward the liquid crystal panel is provided on at least one of the inner surface of the side portion of the case and an outer surface of the side portion of the frame, and the claw portion which is contact with the display surface of the liquid crystal panel in a state in which the claw portion is pressed by the protruding portion.

2. The liquid crystal display device according to claim 1, wherein the liquid crystal panel includes:
   a glass substrate;
   a polarizer which is disposed to the display surface of the glass substrate and whose outer size is smaller than that of the glass substrate; and
   the claw portion is formed so that an end thereof is brought into contact with the display surface of the glass substrate on an outer circumference of the polarizer in a state in which the claw portion is pressed.

3. The liquid crystal display device according to claim 1, wherein the liquid crystal panel includes:
   the first glass substrate disposed to the display surface; and
   the second glass substrate disposed to the rear surface whose outer size is larger than that of the first glass substrate, and
   the claw portion is formed so that an end thereof is brought into contact with the display surface of the second glass substrate on an outer circumference of the first glass substrate in a state in which the claw portion is pressed.

4. The liquid crystal display device according to claim 1, wherein the claw portions are disposed at positions facing with each other on an inner surface of the side portion of the frame.

5. The liquid crystal display device according to claim 4, wherein a distance between the ends of the claw portions that face with each other is larger than the outer size of the display panel in a state in which the case has not been assembled.

* * * * *